Jan. 22, 1935.  E. O. CARVIN  1,988,620
SNOW MOTOR VEHICLE
Filed Sept. 23, 1933  2 Sheets-Sheet 1
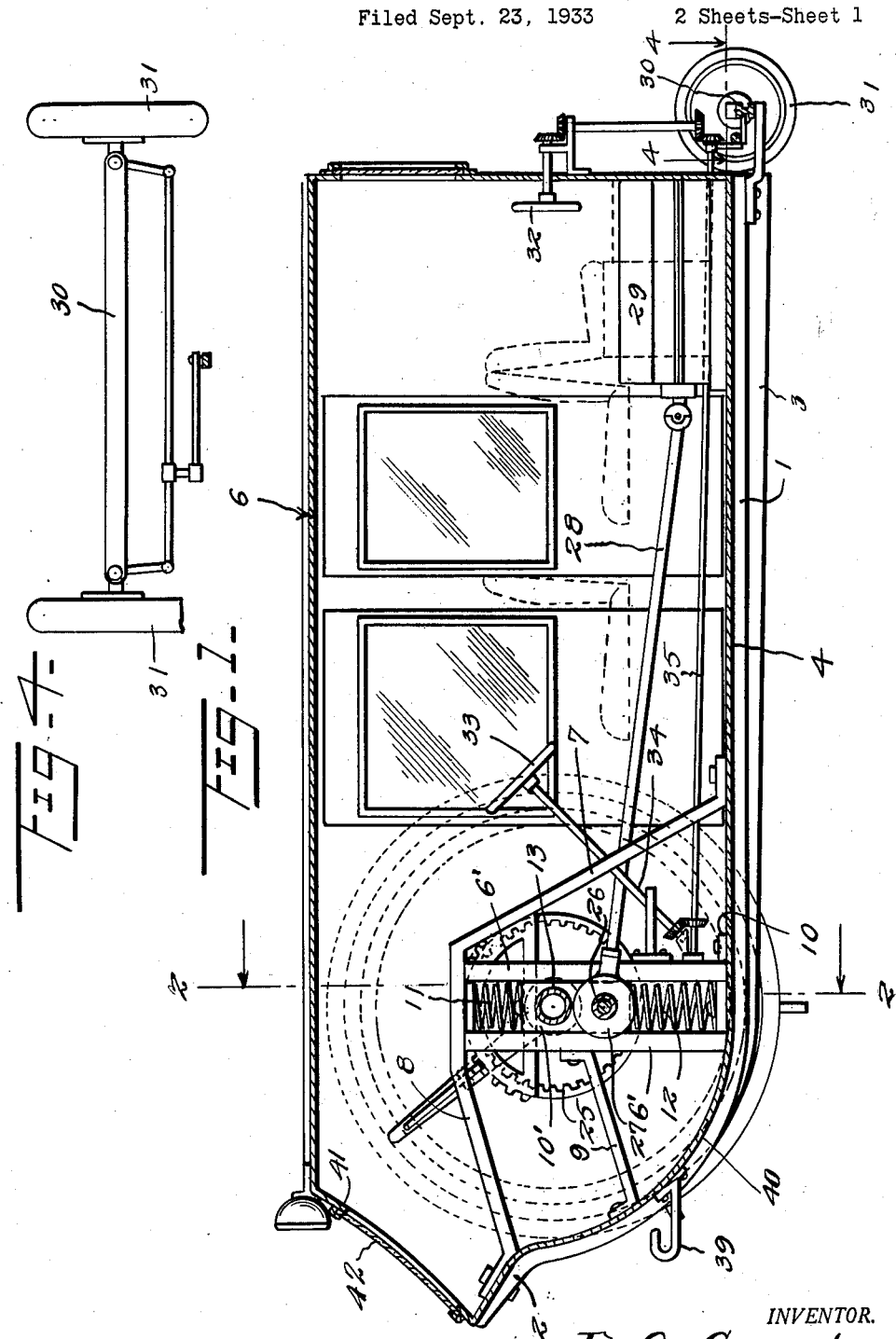
INVENTOR.
E. O. Carvin
BY
Watson E. Coleman ATTORNEYS.

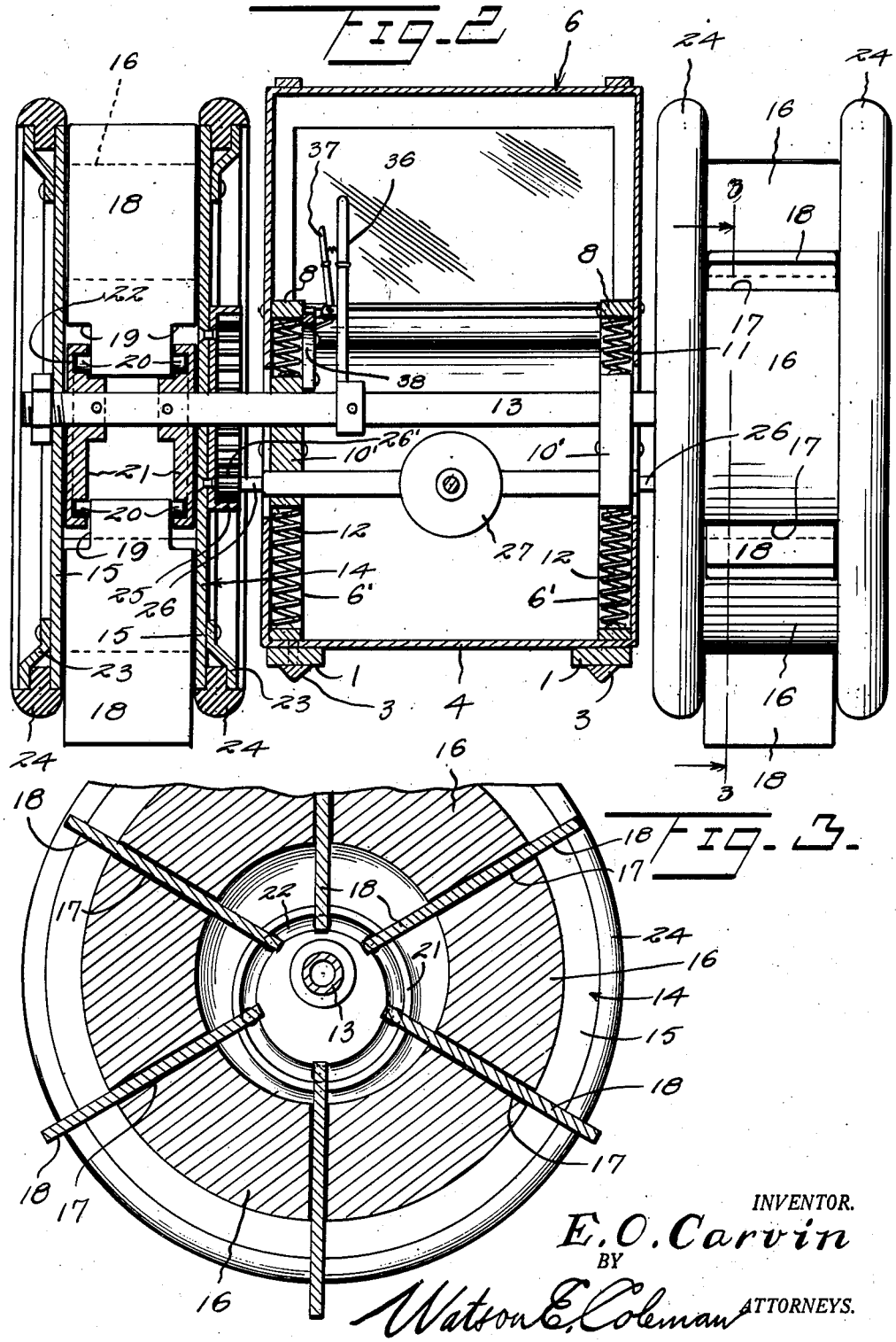

Patented Jan. 22, 1935

1,988,620

UNITED STATES PATENT OFFICE 1,988,620

SNOW MOTOR VEHICLE

Edward O. Carvin, Sierra City, Calif.

Application September 23, 1933, Serial No. 690,738

5 Claims. (Cl. 180—6)

This invention relates to improvements in motor vehicles and pertains particularly to a motor vehicle designed to operate upon snow.

The primary object of the present invention is to provide a vehicle which will operate upon and pass over bodies of a character which would not support other vehicles such, for example, as bodies of snow, marshy or boggy ground, water or quicksand, whereby the carrying of necessary materials over such bodies is facilitated and the rescuing of human beings or animals trapped in such bodies is possible.

Another object of the invention is to provide a vehicle for accomplishing the above described objects, which employs a novel traction mechanism by which the vehicle is driven over bodies of the character referred to.

Still another object of the invention is to provide a vehicle of the character set forth wherein a novel means is employed for making ineffective the particular type of traction means employed for driving the vehicle over soft, yielding bodies, whereby the vehicle may be conveniently operated upon hard ground or paved streets.

Other objects and advantages of the present invention will become apparent as the description of the same proceeds and the invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a longitudinal section through the vehicle embodying the present invention;

Figure 2 is a transverse section taken upon the line 2—2 of Figure 1;

Figure 3 is a sectional view taken upon the line 3—3 of Figure 2.

Figure 4 is a sectional view taken on the line 4—4 of Figure 1.

Referring now more particularly to the drawings wherein like numerals of reference indicate corresponding parts throughout the several views, it will be seen that the vehicle embodying the present invention comprises a chassis frame having the longitudinal side beams 1 which at one end of the structure curve upwardly and forwardly as indicated at 2 to form a prow. These forward portions of the frame structure constitute runners and the horizontal portions thereof have secured to the under surfaces the runners 3 which are of constantly increasing height from the forward end of the vehicle to the rear. Extending across and connecting the beams 1 of the frame and curving upwardly on the curved forward ends of these beams is a sheet metal body 4 which forms the bottom of the vehicle and the side walls of the vehicle constitute vertical extensions of this body and are indicated by the numeral 5. The beams 1 and runners 3 being low, it will be obvious that when the vehicle travels over deep snow or boggy ground, the bottom 4 will form a sledding surface by coming into contact with the underlying surface. The side walls may be connected to form a top in the manner illustrated, if desired, or they may be terminated at an elevation lower than that illustrated so as to form an open vehicle. It is preferable, however, that the same be entirely enclosed to form the body structure which is indicated as a whole by the numeral 6.

At the forward end of the structure and at each side there are disposed the spaced vertical beams 6' which are braced by the arms 7, 8 and 9 and are suitably secured to the chassis frame at their lower ends, as indicated at 10. Between each pair of the beams 6' is disposed a pillar block 10' which is maintained in position substantially midway between the upper and lower ends of the guide beams 6', by the upper and lower springs 11 and 12 respectively.

Extending transversely of the vehicle and passing through the pillar blocks 10' is an axle 13 which is oscillatable in the pillar blocks and upon the outer ends of this axle are mounted, beyond the sides of the vehicle body, the propeller or traction wheels which are each indicated as a whole by the numerals 14.

The traction wheels 14 each consists of the two spaced disks 15 which are connected and held in spaced relation by the spaced segmental bodies 16 which altogether form a relatively heavy annulus between the disks 15, the outer circumference of which is spaced inwardly from and concentric with the edges of the disks.

The spaces 17 between the bodies 16 constitute guides for the plurality of grouser blades 18 which extend transversely of the area between the disks 15 and are designed to be reciprocated radially of the wheel during the operation of the latter, in the manner hereinafter described. Each of these blades 18 has a cut-out corner at its inner end as indicated at 19 and in the area formed by cutting-out the corner, there is located a trunnion pin 20 which is carried by the adjacent edge of the blade and which projects laterally or in the plane of the blade.

Mounted upon each end of the axle 13 within each of the wheels 14, is a pair of eccentric bodies each of which is indicated by the numeral 21 and each of which is secured to the axle adjacent the inner surface of a disk. These bodies are held by the axle while the disks turn freely thereabout. The opposed faces of the eccentric bodies 21 have formed therein the eccentric grooves 22 which follow the peripheral outline of the eccentric body. In these grooves the trunnion pins 20 of the grouser blades 18 engage so that as the disks 15 are turned the trunnion pins will be forced to follow the grooves of the eccentric bodies and the grouser blades will be alternately extended through the guides 17 beyond the periphery of the annulus made up of the bodies 16, and retracted.

Secured to the outer face of each disk 15 is an annular rim 23 which has its outer edge in line with the outer edge of the disk but spaced outwardly therefrom. Between each of these rims 23 and the adjacent disk body, is secured a tire 24 which has a portion which projects beyond the edges of the rim and disks in the manner illustrated.

The inner disks of the propeller or traction wheels 14 have secured to their confronting faces the internal gears 25 which are concentric with the axle 13. Mounted in the pillar blocks 10' are driving axles 26 each of which passes through a differential mechanism housing 27 to connect with a differential mechanism of the character employed in a motor vehicle.

The outer ends of these axles carry pinon gears 26' which mesh with the internal gears 25. Connected with this housing 27 is a tubular casing 28 through which passes a driving shaft (not shown) which is coupled with an engine 29 which is mounted at a suitable point upon the vehicle, preferably at the rear end thereof in the manner illustrated.

At the rear end of the vehicle is mounted the rear axle 30 upon the ends of which are the steering wheels 31 which are preferably of the type employed for steering an automobile, as conventionally illustrated in Figure 4, the usual steering mechanism being utilized and controlled by the dual control illustrated, which consists of a rear steering wheel 32 and a forward steering wheel 33, the latter being coupled through suitable shafts 34 and 35, with the mechanism controlling the wheels 31. The steering of the vehicle is thus accomplished by turning the rear or trailing wheels so that the front wheels will be swung in the desired direction, while the front wheels operate as the traction or pulling wheels as will be readily apparent.

The axle 13 is oscillatable so as to change the positions of the high points of the eccentric bodies 21 with respect to the ground for the control of the grouser blades, by securing to the axle the lever 36 to which is pivotally attached the hand operated pawl 37 which engages the teeth of a toothed segment 38 which is rigidly secured to the adjacent pillar block 10'.

In the operative structure the tires 24 and the tread surfaces of the wheels 31 are disposed to extend slightly below the lowermost points of the runners 3 so that when the vehicle is propelled over hard ground or a paved road the runners will not come in contact therewith. When the vehicle is to be propelled over snow or any other soft surface such as boggy ground, the lever 36 is adjusted to oscillate the axle 13 to the point where the high points of the eccentric bodies 21 will be directed downwardly. When in this position the grouser blades will extend the maximum distance beyond the bodies or blocks 16 as they pass beneath the eccentric bodies 21 and, therefore, they will be projected into the snow or other soft material over which the vehicle is passing and will engage the material and effectively force the vehicle forwardly. As the wheels 14 turn by reason of the power transmitted thereto through the axles 26 and the gears 25 and 26' the blades 18 will be withdrawn from the material underlying the wheels so that no resistance will be offered by the wheels having to raise some of the underlying supporting material on the blades as the wheels rotate. It will thus be seen that as a result of the broad supporting surface forming the bottom of the vehicle, the same will be effectively supported on any soft underlying body and will also be caused to slide thereon by reason of the paddling effect of the blades 18.

When the vehicle is to be operated over a hard surface the axle 13 may be oscillated so as to turn the eccentric bodies 21 in a manner to raise the high points thereof above the axle on which they are mounted so that the front wheels will be supported solely upon the tires 24 and the blades will be retracted as they pass beneath the eccentric bodies.

Should it become necessary, for any reason, to tow the vehicle a suitable towing connection may be made therewith through the medium of the draw bar or hook 39 which is attached thereto at the forward end.

It will be seen that the forward end of the vehicle body has the bottom curved upwardly and forwardly into a wide arch to form the prow or breast 40 whereby the passage of the vehicle over snow banks or through deep snow is facilitated. The tip of this prow is joined by the downwardly and forwardly curving wall 41 in which a window 42 is disposed whereby the occupants of the vehicle may view the terrain over which the vehicle is traveling.

Having thus described the invention, what is claimed is:—

1. A motor sled having a broad bottom the under surface of which may form a sledding surface, said bottom being extended upwardly and forwardly at one end, a pair of supporting wheels at the forward end of the body, a motor carried by the body and connected with said wheels for rotating the same, a supporting wheel at the rear of said body, a plurality of paddle-like blades carried by said forward wheels and adapted to reciprocate radially thereof, means operating through the rotation of said first wheels for reciprocating said blades, and means for steering the vehicle.

2. A motor sled, comprising a body having a frame and a relatively broad bottom carried by the frame, the under side of which may form a sledding surface, said bottom being curved upwardly and forwardly to form a bow, a pair of pillar blocks mounted upon the body at the forward end, an axle carried by said pillar blocks and extending transversely of the body, a pair of wheel units carried by said axle, each of said units comprising a pair of spaced disks mounted upon the axle for free rotation thereabout, guide elements between the disks, a plurality of blades disposed between the disks and held for radial movement by said guide elements, eccentrics carried by said axle, connecting means between said eccentrics and said blades whereby rotation of the disks upon the axle effects the reciprocation of the blades, power means for rotating said disks, and means for steering the sled.

3. A motor sled, comprising a body having a frame and a relatively broad bottom carried by the frame, the under side of which may form a sledding surface, said bottom being curved upwardly and forwardly to form a bow, a pair of pillar blocks mounted upon the body at the forward end, an axle carried by said pillar blocks and extending transversely of the body, a pair of wheel units carried by said axle, each of said units comprising a pair of spaced disks mounted upon the axle for free rotation thereabout, guide elements between the disks, a plurality of blades disposed between the disks and held for radial movement by said guide elements, eccentrics carried by said axle, connecting means between said eccentrics and said blades whereby rotation of the disks upon the axle effects the reciprocation of the blades, power means for rotating said disks, means for steering the sled, and means for oscillating said axle and eccentrics whereby the reciprocation of the blades may be controlled.

4. A motor sled comprising a body having a broad bottom, the under side of which may form a sledding surface, an axle disposed transversely of the body at one end, a pair of rotatable body supporting units carried upon the axle, each of said units comprising a pair of spaced disk members, a plurality of segmental bodies connecting the disk members and retaining the same in spaced relation, said segmental bodies being in spaced relation to provide guide passages and further having their outer convex surfaces spaced inwardly from the edges of the disks, paddle blades slidably disposed between said segmental bodies, an eccentric disposed between said disks and mounted upon said axle, connecting means between the blades and the eccentrics, power means for rotating said disks on said axle, a tire carried by a disk of each unit, means for oscillating said axle and eccentrics for shifting the high point of the eccentrics for the control of said blades, and means for supporting and steering the other end of the body.

5. A structure of the character described, comprising a body, a pair of runners extending longitudinally of the underside of the body, a pair of pillar blocks each disposed adjacent one side of the body, guide means for said pillar blocks whereby the same are held for vertical movement, said pillar blocks constituting bearings, resilient elements disposed above and below the pillar blocks for resiliently resisting the vertical movement of the same, an axle extending transversely of the body and passing through said blocks, a pair of wheel units mounted upon said axle for free rotation thereon, a plurality of blade elements constituting a part of each wheel unit and disposed radially about said axle, eccentric elements in each wheel unit secured to the axle and having sliding connection with said blades, a power mechanism in the structure, means for imparting rotary motion to the wheel units from the power mechanism, means for steering the structure, and means for controlling the radial movements of the blades with respect to the wheel units.

EDWARD O. CARVIN.